United States Patent

Kanda et al.

[11] Patent Number: 5,639,515
[45] Date of Patent: Jun. 17, 1997

[54] METHOD FOR POST-TREATMENT OF PLATED STEEL SHEET FOR SOLDERING

[75] Inventors: Katsumi Kanda; Junichi Fujimoto; Takashi Tanaka; Masashi Ichishima; Yoshikazu Kondo, all of Yamaguchi-ken, Japan

[73] Assignee: Toyo Kohan Co., Ltd., Tokyo, Japan

[21] Appl. No.: 494,760

[22] Filed: Jun. 26, 1995

Related U.S. Application Data

[63] Continuation-in-part of Ser. No. 275,757, Jul. 18, 1994, abandoned, which is a continuation of Ser. No. 637,393, Jan. 4, 1991, abandoned, which is a continuation-in-part of Ser. No. 118,939, Nov. 10, 1987, abandoned.

[51] Int. Cl.$^6$ ................................ B05D 3/02; B05D 3/12
[52] U.S. Cl. .................. 427/327; 205/196; 228/180.1; 228/214; 427/334; 427/388.4; 427/404; 427/417
[58] Field of Search ................ 228/214, 180.1; 205/196; 427/334, 404, 416, 417, 327, 388.4

[56] References Cited

U.S. PATENT DOCUMENTS

| | | | |
|---|---|---|---|
| Re. 30,696 | 8/1981 | Arbib et al. | 148/23 |
| 3,716,421 | 2/1973 | Burkhart et al. | 228/214 |
| 3,886,079 | 5/1975 | Burke, Jr. | 252/109 |
| 4,123,562 | 10/1978 | Chandross et al. | 228/214 |
| 4,130,524 | 12/1978 | Boerwinkle et al. | 422/156 X |
| 4,224,205 | 9/1980 | Nakagawa et al. | 260/29.6 B |
| 4,373,656 | 2/1983 | Parker et al. | 228/214 |
| 4,722,805 | 2/1988 | Martin | 252/8.555 |
| 4,876,116 | 10/1989 | Mehan et al. | 427/388.1 |
| 4,888,132 | 12/1989 | Kohashi et al. | 252/393 |
| 4,915,864 | 4/1990 | Kita et al. | 252/117 |
| 5,011,711 | 4/1991 | Kanda et al. | 427/334 |

FOREIGN PATENT DOCUMENTS

| | | |
|---|---|---|
| 54-15432 | 2/1979 | Japan . |
| 61-19793 | 1/1986 | Japan . |
| 3161191 | 7/1991 | Japan . |

OTHER PUBLICATIONS

Rose, Arthur et al., The Condensed Chemical Dictionary, 7th Edition, Reinhold Book Corp., New York 1966, pp. 1, 691, 704, 852, 891.

Silman, H. et al, Protective and Decorative Coatings for Metals, Finishing Publications, Ltd., Teddington, Middlesex, England, 1978.

*Primary Examiner*—Michael Lusignan
*Attorney, Agent, or Firm*—Felfe & Lynch

[57] ABSTRACT

Electroplated steel sheet suitable for soldering is provided herein by coating the plated steel sheet with a post-treatment solution in the range of 0.02 to 2 μm in dry thickness. The post-treatment solution contains from 2 to 100 g/l of at least one water-soluble or water-dispersed material. The post-treatment solution may further contain chromium ion, hereafter referred to as $Cr^{6+}$, from 0.01 to 3 g/l, and/or organic amine soap from 10 to 100 g/l. A suitable pH value of the post-treatment solution is from 3 to 10.

8 Claims, No Drawings

METHOD FOR POST-TREATMENT OF PLATED STEEL SHEET FOR SOLDERING

CROSS-REFERENCE TO RELATED APPLICATIONS

This application is a continuation in part of application Ser. No. 08/275,757, filed Jul. 18,1994, abandeoned, which is a continuation of application Ser. No. 07/637,393, filed Jan. 4, 1991, abandoned, which is a continuation in part of application Ser. No. 07/118,939, filed Nov. 10, 1987, abandoned.

FIELD OF THE INVENTION

The present invention relates to the post-treatment of plated steel sheet for soldering and especially to the post-treatment solution which exhibits excellent wettability and adhesive strength to solder, hereafter referred to as solderability, as well as excellent corrosion resistance, formability and durability.

DESCRIPTION OF THE PRIOR ART

Recently, Sn plated steel sheet, Pb-Sn plated steel sheet, Cu plated steel sheet or Zn plated Steel sheet have been used for a plated steel sheet suitable for soldering. However, these plated steel sheets easily corrode without post-treatment during packing or after assembling. Therefore, post-treatments such as chromate treatment, phosphate treatment or coating of anti-corrosion primer are applied on said steel sheets.

In the case of chromate treatment, it is not suitable because more than 0.1 mg/dm$^2$ of Cr$^{6+}$ is necessary in order to provide sufficient corrosion resistance. However, in the case of more than 0.05 mg/dm$^2$ of Cr$^{6+}$, a strong flux is necessary for soldering. The use of strong flux causes deterioration of the working environment and decrease of corrosion resistance of the soldered surface. Therefore, the amount of Cr$^{6+}$ is limited to less than 0.05 mg/dm$^2$ and does not provide sufficient corrosion resistance.

On the other hand, the application of an anti-corrosion primer causes a decrease in solderability similar to chromate treatment and also a decrease in the corrosion resistance of the soldered location.

There is some prior art relating to a process for production of plated steel sheet for soldering, for example, Japanese Patent Application Laid-Open No. Sho. 61-19793 and Japanese Patent Application Laid-Open No. Sho. 54-15432. However, the present invention is different from these inventions with regard to construction and materials used. Japanese Patent Application Laid-Open No. Sho. 61-19793 relates to a plated steel sheet having excellent solderability that is summarized as follows: Sn or Sn-Pb alloy is plated on the Zn or Zn type alloy plated steel sheet with the amount of deposit from 0.1 to 100 g/m$^2$. However, the price of Sn is so expensive that the cost of production is high and use of Pb is undesirable from the viewpoint of environmental pollution. The present invention is different from this invention with regard to construction and materials used.

On the other hand, Japanese Patent Application Laid-Open No. Sho. 54-15432 relates to a post-treatment that is summarized as follows: Zn plated steel sheet is covered with acrylic resin from 0.5 to 20 μm in thickness or paraffin wax from 2 to 20 μm in thickness. The present invention is different from this invention with regard to materials used and effects on solderability and corrosion resistance.

BRIEF SUMMARY OF THE INVENTION

The electroplated steel sheet is coated with a post-treatment solution in the range of 0.02 to 2 μm in dry thickness. The post-treatment solution contains from 2 to 100 g/l of at least one water-soluble or water-dispersed material such as:

a. condensates prepared from fatty higher alcohols, alkylphenols or fatty acids with ethylene oxides,
b. polyethylene glycol alkylamines,
c. esters prepared from sorbitan and fatty acids,
d. surfactants prepared from polypropylene glycols (as a hydrophobic group) and polyethylene glycols (as a hydrophilic group),
e. amides prepared from fatty acids and diethanol amines,
f. esters prepared from fatty acids and sucrose,
g. saponificates prepared from lanolin alcohol or lanolin fatty acids,
h. abietic acid,
i. benzoic acid,
j. saturated fatty acids having 12 to 24 carbon atoms,
k. unsaturated fatty acids having 12 to 24 carbon atoms.
l. alcohols laving 2 to 400 carbon atoms,
m. esters prepared from fatty acids and glycerol,
n. derivatives of benzotriazoles,
o. metalates, ammonium salts and amine salts of materials h. through n., and
p. paraffin waxes, Moreover, there may be employed 0.01 to 3 g/l Cr$^{6+}$ and/or 10 to 100 g/l of organic amine soap.

DETAILED DESCRIPTION OF THE INVENTION

The detailed method according to the present invention will be described below:

The main components of the present invention are:

a. water-soluble or water-dispersed fatty higher alcohols, alkylphenols and condensates prepared from fatty higher alcohols, and alkylphenols or fatty acids with ethylene oxide: include polyethylene glycol alkyl ethers, polyethylene glycol alkylphenyl ethers and polyethylene glycol fatty acid esters.

b. polyethylene glycol-alkylamines such as N-polyethylene glycol-alkyl amine and polyethylene glycol-alkyl ether, c. esters prepared from sorbitan and fatty acids including sorbitan-fatty acid ester and polyethylene glycol-sorbitan fatty acid ester, d. surfactants prepared from Polypropylene glycol (as hydrophobic group) and polyethylene glycol (as hydrophilic group) such as polypropylene glycol-polyethylene glycol ether, e. amides prepared from fatty acid and diethanol amines such as fatty acid-diethanol amides, f. esters prepared from fatty acids and sucrose such as sucrose-fatty acid esters, g. saponificates prepared from lanolin alcohol or lanolin fatty acid such as Polyoxyethylene-lanolin alcohol ether and polyoxyethylene lanolin fatty acid esters.

h. abietic acid, i. benzoic acid, j. saturated fatty acids which have 12 to 24 carbon atoms, such as stearic acid, lauric acid, palmitic acid, k. unsaturated fatty acids which have 12 to 24 carbon atom, such as oleic acid, l. organic alcohols such as glycerol, ethylene glycol and polyethylene glycol having 4 to 400 carbon atoms, m. esters of fatty acids such as fatty acid-glycerol esters, and n. derivatives of benzotriazole such as benzotriazole, azimidole, 1-N-benzoyl-benzotriazole.

The effects of the present invention are controlled by the amount of post-treatment coating on the plated sheet, and are not influenced by concentration of post-treatment solution. However, a specified concentration is preferred in order to facilitate operation. Halogen ion is not preferred because it decreases corrosion resistance.

In order to stabilize the post-treatment solution and to improve the corrosion resistance and abrasion resistance, $Cr^{6+}$ and/or a soap of an organic amine are used. The concentration of $cr^{6+}$ over 3 g/l remarkably decreases solderability and is not suitable for it.

Soaps of organic amines include dodecylamine, oleoyl imidazoline, aminopropyl beef tallow amine, rosin amine. The amine may be used as a salt with carbonic acid. The concentration of amine over 100 g/l has some effects on corrosion resistance but less effect on solderability and is not preferred.

Moreover, well-known water-soluble or water-disperible anti-corrosion agents are available, but in this case, it is important to restrict the amount of addition in order not to decrease the solderability. For example addition of acrylic emulsion increases the abrasion resistance but inversely decreases the solderability.

The pH value of the solution is suitably in the range of from 3 to 10. If the pH of the solution is under 3, the stability of the solution decreases. If the pH of the solution is over 10, drying properties of the post-treatment decrease the Hydrophile-Lipophile Balance (HLB) value of the solution is suitably more than 10. If the HLB value of solution is under 10, the drying properties of the solution decrease.

The temperature of the post-treatment is not limited, however, at over 80° C., the stability of the post-treatment solution decreases, resulting in gelation. An ordinary temperature in the range from 20 to 40° C. is suitable and economical.

The coating method is not restricted and roll-coating, knife-coating, dipping followed by wringer roll or air-knife treatment are used. The post-treatment product must be sufficiently dry to be handled.

The dry film thickness in the range of 0.01 to 2 μm is suitable. A dry film thickness below 0.01 μm, has no effects on the corrosion resistance. At a dry film thickness above 2 μm, corrosion resistance increases but solderability does not increase.

In the present invention, the post-treatment solution which may further contain $Cr^{6+}$ or organic amine soap, can be applied on an Sn plate, Pb-Sn plate, Cu plate or Zn plate. Solderability and corrosion resistance of said steel sheets increase, even if after aging. Steel sheets are not restricted to said steel sheet.

The reason why the properties of the coated steel sheet of the present invention improve, has not been clarified. However, formation of oxides, hydroxides and carbonates are inhibited by coating the present post-treatment solution on said plated steel sheet.

Moreover, it is considered that since the present post-treatment dissolves or reduces the metal oxides which have formed on the plated steel sheet over time, the wetting and diffusion of solder are promoted and solderability is improved. According to said phenomenon, the present post-treatment film covers the plated steel sheet uniformly and increases the corrosion resistance.

The present invention is based on the above-mentioned concept. By coating the present post-treatment solution on the plated steel sheet uniformly, a plated steel sheet having excellent solderability and corrosion resistance can be continuously produced.

Specific embodiments of the present invention are as follows:

EXAMPLE 1

A cold-rolled steel sheet having thickness of 0.5 mm was used as the substrate and was treated by ordinary alkali cleaning and pickling. After water spraying, the substrates were electroplated in a sulfuric acid bath at the weight of 5 $g/m^2$ of Zn deposit and were treated in accordance with the present invention. In this regard, a post-treatment solution containing 10 g/l of ammonium stearate, 20 g/l of glycerol and 5 g/l of paraffin wax was coated on the Zn plated steel sheet by a dipping method and the thus-coated steel sheet was dried at the temperature of 60° C. to form a coating of 0.5 μm thickness thereon.

Examples 2–17 of the present invention were treated according to the same procedure as Example 1, except for the type and amount of deposit and post-treatment.

COMPARATIVE EXAMPLE I

The same substrates as in Example 1 were treated by ordinary alkali cleaning and pickling. After water spraying, the substrate was electroplated in a sulfuric acid bath at the weight of 10 $g/m^2$ of Zn deposit and was electroplated in a phenolsulfonic acid bath (40° C., 30 A/d $m^2$) according to Japanese Laid-Open Patent Application No. Sho 61-19793.

Comparative Example 2 was performed according to Japanese Laid-Open Patent Application No. Sho 54-15432. Comparative Examples 3–12 were performed according to the same procedure as Comparative Example 2, except for the type and amount of the deposit and post-treatment. The conditions for the post-treatments were summarized in Table 1 and the evaluation of properties was summarized in Table 2.

As mentioned in Table 2, post-treatment solution of this invention showed excellent effects on corrosion resistance, solderability and aging tests. Ordinary chemical treatments such as chromate treatment or phosphate treatment (Comparative Examples 3–5) showed effects on corrosion resistance but decreased the wettability of the solder. Furthermore, the color of the surface after aging had changed and decreased the corrosion resistance.

Comparative Examples 6–8, which lacked polyethylene glycol alkylphenyl ether, polypropylene glycol polyethylene glycol ether, benzoic acid and polyethylene glycol oleate ester from Example 6–8, showed excellent corrosion resistance, but inferior effects on solderability and solderability after aging.

Comparative Examples 9–11, which contained halogen in the post-treatment solution, showed excellent solderability but inferior effects on solderability after aging compared to the present post-treatment.

As mentioned in Examples 1–17, in Table 1 and 2, excellent corrosion resistance, solderability and formability were obtained and these properties after aging of plated steel sheet can be achieved by using the present invention.

Evaluation: The metal substrates which were prepared in Examples 1–17 and Comparative Examples 1–12 were evaluated by the following test methods. The results were shown in Tables 1 and 2.

(1) Spreadability of solder: a sample steel sheet, 50×50 mm in size, was floated on the solder-bath at a temperature of 250° C. The amount of 0.4 g of bended wire solder, that is, resin flux cored solder (JIS Z 3283) was placed on the sample steel sheet for 30 seconds. The area of solder spread was measured after cooling.

◯: Area of spread solder >200 mm²
Δ: 200 mm² ≥ area of spread solder >50 mm²
X: Area of spread solder <50 mm (2) Combination strength of solder: a bundle of twenty wires (φ=0.18 mm) was placed on the test steel sheet and joined with the resin flux solder (RH 50) and was subjected to a pull off test (Bundle of twenty copper wires and solder steel sheet were pulled in opposite directions and evaluated as to the appearance of separated place).

◯: No separation among wire, solder and soldered steel sheet

X: Separation between, wire and solder, or solder and soldered steel sheet (3) Corrosion resistance: a sample steel sheet was subjected to 2 cycles of a salt spray test (JIS Z 2371: salt spray 8 hours and dry 16 hours) and evaluated from generation of red rust.

◯: No red rust

X: entirely red rust (4) Formability: sample steel sheets were subjected to the Erichsen test (Er=7 mm) and Du Pont impact test (½"×1 kg×30 cm) and were evaluated as to formability by the adhesive tape test.

◯: No separation between plated steel sheet and post-treatment

X: Separation between plated steel sheet and post-treatment (5) Aging: sample steel sheets were subjected to a thermo-hygrostat(60° C., RH 95%) for 1,000 hours and evaluated as to the appearance (or color change), corrosion resistance and solderability in the same way as in evaluations (1)–(4).

TABLE 1

Preparation and Condition of Specimens

| | Type of Plating | Amount of Deposit (g/m²) | Post-treatment Solution of This Invention | (g/l) | Thickness (μm) |
|---|---|---|---|---|---|
| Example | | | | | |
| 1 | Zn plated | 5 | ammonium stearate | 10 | 0.5 |
| | | | glycerol | 20 | |
| | | | paraffin wax | 5 | |
| 2 | Zn plated | 10 | benzotriazole | 2 | 0.05 |
| | | | abietic acid | 1 | |
| | | | $CrO_3$ | 0.2 | |
| 3 | Sn plated | 5 | oleic acid | 50 | 3 |
| | | | rosin (amine salt) | 10 | |
| 4 | Cu plated | 3 | ester prepared from fatty acid and glycerol | 20 | 0.2 |
| | | | paraffin wax | 10 | |
| 5 | Sn—Pb plated | 10 | ethylene glycol | 30 | 1 |
| | | | $CrO_3$ | 1 | |
| 6 | Zn plated | 5 | polyethylene glycol alkylphenyl ether (Emaruzitto-16: Daiichikogyo Seiyaku Co. LTD) | 10 | 0.5 |
| | | | $CrO_3$ | 1 | |
| 7 | Zn plated | 10 | polypropylene-glycol polyethylene-glycol ether (Epan-720: Daiichikogyo Seiyaku Co. LTD) | 100 | 0.5 |
| | | | benzoic acid | 5 | |
| | | | $CrO_3$ | 0.02 | |
| 8 | Sn plated | 2 | polyethylene glycol oleate ester (Noigen-ES90: Daiichikogyo Seiyaku Co. LTD) | 2 | 2 |
| | | | $CrO_3$ | 0.02 | |
| 9 | Sn plated | 5 | polyethylene glycol stearate (Noniolite-T40: Kyoueisya Yushi Co. LTD) | 5 | 0.02 |
| | | | abietic acid | 1 | |
| 10 | Cu plated | 3 | sorbitan oleate (Noniolite-SPS: Kyoueisya Yushi Co. LTD) | 50 | 0.2 |
| | | | $CrO_3$ | 1 | |
| 11 | Sn—Pb plated | 10 | polyoxyethylene alkylpropylene diamine (Noniolite-DNT-10: Kyoueisya Yushi Co. LTD) | 10 | 0.5 |
| | | | $CrO_3$ | 1 | |
| 12 | Zn plated | 5 | abietic acid | 20 | 2 |
| | | | paraffin wax | 50 | |
| | | | $CrO_3$ | 0.02 | |
| 13 | Zn plated | 10 | benzoic acid | 2 | 0.5 |
| | | | rosin (amine salt) | 100 | |
| 14 | Sn plated | 2 | oleic acid | 5 | 0.01 |
| | | | $CrO_3$ | 3 | |
| | | | Rosin (amine salt) | 10 | |
| 15 | Sn plated | 5 | ethylene glycol | 10 | 0.1 |
| | | | rosin (amine salt) | 5 | |
| | | | $CrO_3$ | 0.2 | |
| 16 | Cu plated | 3 | oleic acid | 50 | 0.5 |
| | | | dodecylamine | 100 | |
| 17 | Sn—Pb plated | 10 | ammonium stearate | 10 | 0.2 |
| | | | paraffin wax | 5 | |
| Comparative Example | | | | | |
| 1 | Zn plated | 10 | Sn plated | 0.5 | — |

TABLE 1-continued

Preparation and Condition of Specimens

| | Type of Plating | Amount of Deposit (g/m²) | Post-treatment Solution of This Invention | (g/l) | Thickness (μm) |
|---|---|---|---|---|---|
| 2 | Zn plated | 10 | (according to Japanese Pat. Application No Sho 61-19793) paraffin wax (according to Japanese Pat. Application No Sho 54-15432) | 100 | 3 |
| 3 | Sn plated | 5 | phosphate treatment | | 2 g/m² as P |
| 4 | Sn plated | 5 | chromate treatment | | 0.05 mg/dm² as Cr |
| 5 | Cu plated | 3 | chromate treatment | | 0.05 mg/dm² as Cr |
| 6 | Zn plated | 5 | $CrO_3$ | 1 | 0.5 |
| 7 | Zn plated | 10 | $CrO_3$ | 0.02 | 2 |
| 8 | Sn plated | 2 | $CrO_3$ | 0.02 | 0.02 |
| 9 | Zn plated | 5 | aniline hydrochloride | 20 | dipping (1 sec.) |
| 10 | Zn plated | 10 | substituted by hydrazinium hydrochloride for benzotriazole in example 2 | | 0.02 |
| 11 | Zn plated | 2 | substituted by Sn(IV)chloride for parraffin wax | | 0.05 mg/dm² as Cr |
| 12 | Zn plated | 10 | — | | — |

TABLE 2

Evaluation of Characteristics

| Sample Number | Corrosion Resistance | Solderability | | Form-ability | Change of Color |
|---|---|---|---|---|---|
| | | Spread-ability | Strength | | |
| Example | | | | | |
| 1 | o | o | o | o | o |
| 2 | o | o | o | o | o |
| 3 | o | o | o | o | o |
| 4 | o | o | o | o | o |
| 5 | o | o | o | o | o |
| 6 | o | o | o | o | o |
| 7 | o | o | o | o | o |
| 8 | o | o | o | o | o |
| 9 | o | o | o | o | o |
| 10 | o | o | o | o | o |
| 11 | o | o | o | o | o |
| 12 | o | o | o | o | o |
| 13 | o | o | o | o | o |
| 14 | o | o | o | o | o |
| 15 | o | o | o | o | o |
| 16 | o | o | o | o | o |
| 17 | o | o | o | o | o |
| Comparative Example | | | | | |
| 1 | Δ–o | o | o | o | Δ–o |
| 2 | o | Δ | Δ | o | o |
| 3 | Δ | x | x | o | Δ–o |
| 4 | x | o | o | o | Δ |
| 5 | Δ | o | o | o | x |
| 6 | O | x | x | o | O |
| 7 | O | x | x | o | O |
| 8 | O | x | x | o | O |
| 9 | x | o | o | o | x |
| 10 | x | o | o | o | x |
| 11 | x | o | o | o | x |
| 12 | x | o | o | o | x |

TABLE 3

Evaluation of Characteristics After 1,000 Hours Aging

| Sample Number | Corrosion Resistance | Solderability | | Strength | Formability |
|---|---|---|---|---|---|
| | | Spreadability | | | |
| Example | | | | | |
| 1 | o | o | | o | o |
| 2 | o | o | | o | o |
| 3 | o | o | | o | o |
| 4 | o | o | | o | o |
| 5 | o | o | | o | o |
| 6 | o | o | | o | o |
| 7 | o | o | | o | o |
| 8 | o | o | | o | o |
| 9 | o | o | | o | o |
| 10 | o | o | | o | o |
| 11 | o | o | | o | o |
| 12 | o | o | | o | o |
| 13 | o | o | | o | o |
| 14 | o | o | | o | o |
| 15 | o | o | | o | o |
| 16 | o | o | | o | o |
| 17 | o | o | | o | o |
| Comparative Example | | | | | |
| 1 | Δ | x | | x | o |
| 2 | Δ | x | | x | o |
| 3 | Δ | x | | x | o |
| 4 | x | x–Δ | | x–Δ | o |
| 5 | Δ | x | | x | o |
| 6 | Δ | x | | x | o |
| 7 | Δ | x | | x | o |
| 8 | Δ | x | | x | o |
| 9 | x | Δ | | Δ | o |
| 10 | x | Δ | | Δ | o |
| 11 | x | Δ | | Δ | o |
| 12 | x | Δ | | Δ | o |

We claim:

1. In a method for soldering plated steel sheet, the improvement which comprises pre-treatment of said plated steel sheet which comprises the steps of (1) coating said sheet with a soldering pre-treatment solution having a pH from 3–10, a Hydrophile-Lipophile Balance number of more than 10 and containing at least one water-soluble or water dispersible material selected from the group consisting of, abietic acid, benzoic acid, saturated fatty acids having from 12 to 24 carbon atoms, unsaturated fatty acids having from 12 to 24 carbon atoms and metallic salts, ammonium salts and amine salts of said acids, said solution containing from 2 to 100 g/l of said material, and (2) drying the coated sheet to obtain a coating with a thickness in the range of 0.01 to 2 μm.

2. Method of claim 1 wherein said material is one or more acids selected from the group consisting of abietic acid, benzoic acid and fatty acids.

3. Method of claim 1 wherein said material is abietic acid or a metalate, ammonium salt or amine salt thereof.

4. Method of claim 1 wherein said material is benzoic acid or a metalate, ammonium salt or amine salt thereof.

5. Method of claim 1 wherein said material is a saturated fatty acid having from 12 to 24 carbon atoms or a metalate, ammonium salt or amine salt thereof.

6. Method of claim 1 wherein said material is an unsaturated fatty acid having from 12 to 24 carbon atoms or a metalate, ammonium salt or amine salt thereof.

7. Method of claim 5 wherein said material is selected from the group consisting of stearic acid, lauric acid and palmitic acid.

8. Method of claim 6 wherein said material is oleic acid.

* * * * *